Aug. 24, 1937.  R. SHELLENBERGER  2,091,231
FLUID HEAT EXCHANGE APPARATUS
Filed Dec. 27, 1934  2 Sheets-Sheet 1

INVENTOR
Rolfe Shellenberger
BY
ATTORNEY

Aug. 24, 1937.  R. SHELLENBERGER  2,091,231
FLUID HEAT EXCHANGE APPARATUS
Filed Dec. 27, 1934  2 Sheets-Sheet 2
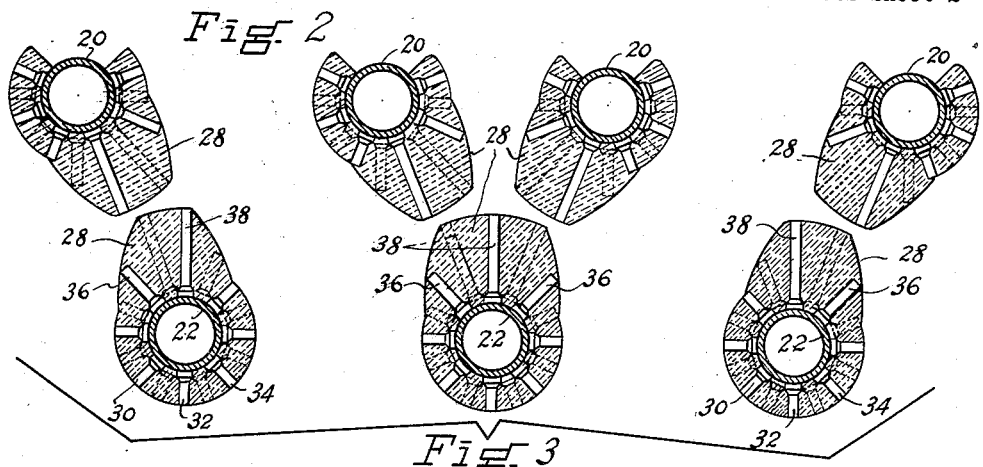
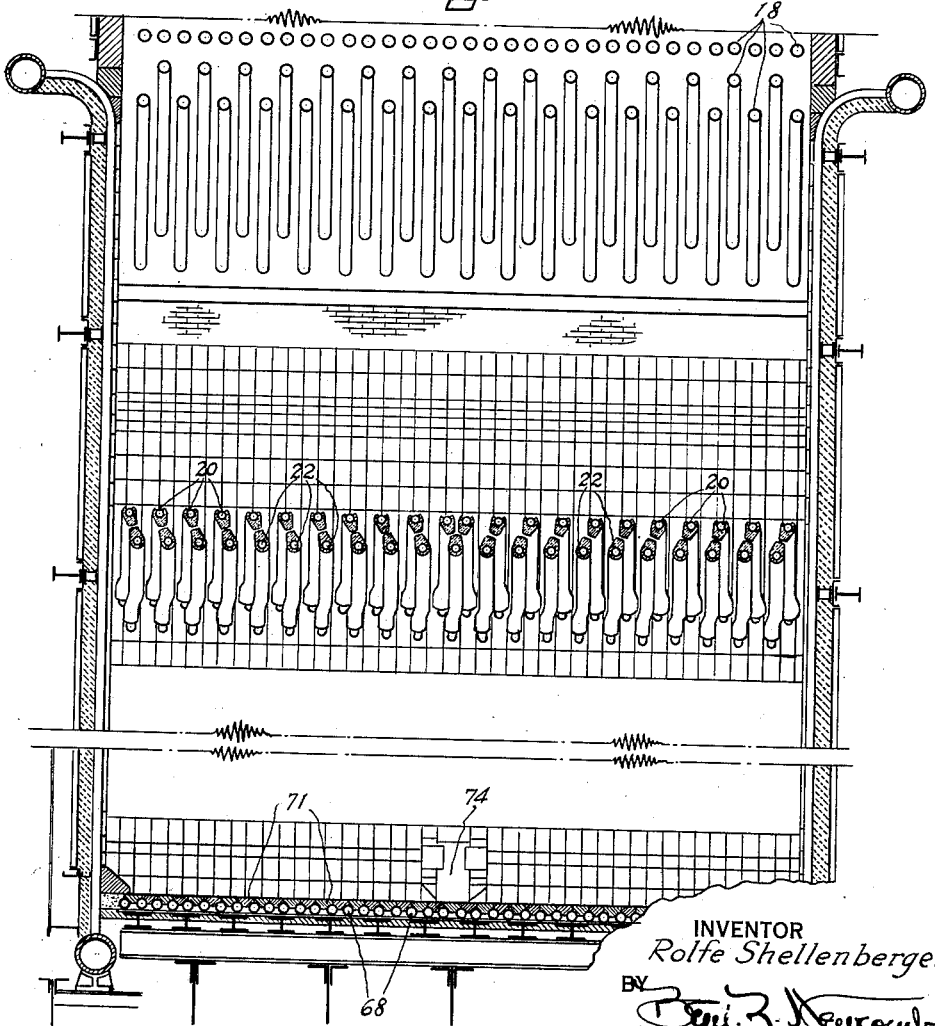
INVENTOR
Rolfe Shellenberger
BY
ATTORNEY Patented Aug. 24, 1937

2,091,231

UNITED STATES PATENT OFFICE 2,091,231

FLUID HEAT EXCHANGE APPARATUS

Rolfe Shellenberger, Westfield, N. J., assignor to The Babcock & Wilcox Company, Newark, N. J., a corporation of New Jersey Application December 27, 1934, Serial No. 759,342

12 Claims. (Cl. 122—235)

This invention relates to furnaces for fluid heat exchange apparatus and it is particularly concerned with boiler furnaces in the normal operation of which there are solids in suspension in the furnace gases. A pulverized coal fired furnace is an example.

It is an object of the invention to provide a steam boiler and furnace organization in which radiantly transmitted heat is advantageously controlled. In large installations of this character, and, more especially when pulverized coal is burned in a furnace having fluid cooled walls, it is advantageous to use a fluid cooled slag collecting and gas agitating screen which effects such a heat distribution across the furnace that the absorption of radiant heat by the steam generating tubes above the screen is held within desirable limits without excessive reduction in the radiant heat absorption by the furnace walls above the screen. Thus, the steam generating tubes are protected from overheating and from excessive slag deposits thereon while provision is also made for the advantageous use of radiantly heated fluid heat exchange surface above the screen.

For the purposes of combustion it is a desideratum to have high temperatures in the ignition zones of such furnaces but the effectiveness of heating surfaces beyond the furnace is impaired if suspended solids collect thereon excessively. It is also an object of the invention to provide improved apparatus promoting higher ignition zone temperatures while minimizing the impairment of fluid heat exchange at surfaces beyond the furnace but subjected to contact with the furnace gases.

A further object of the invention is to provide a screen for a pulverized coal fired furnace in which the screen tubes have refractory sheaths so related that the effectiveness of the screen is increased.

The particular embodiment of the invention herein selected for the purpose of illustration is shown in the accompanying drawings, in which:

Fig. 2 is a partial sectional view of the furnace screen tubes, shown on an enlarged scale.

Fig. 3 is a partial vertical section taken at right angles to the plane upon which Fig. 1 is taken, and on the line 3—3 of Fig. 1.

Figure 1:
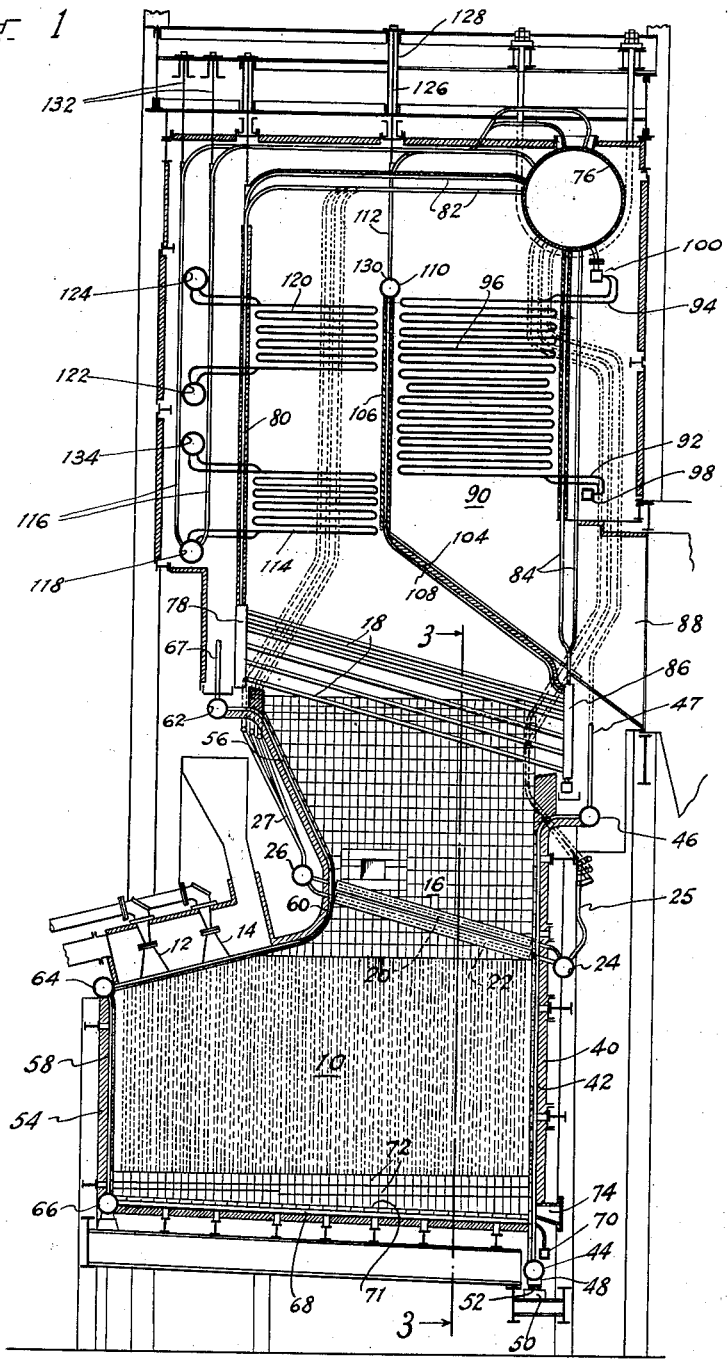
Fig. 1 is a view in the nature of a vertical section through a steam boiler and furnace installation.

In the drawings there is shown a pulverized fuel fired furnace 10 with its burners 12 and 14. A part of this furnace is shown as somewhat restricted so as to form what may be termed a furnace throat. This is indicated at 16. Above the furnace is illustrated a bank of steam generating tubes 18 of a water tube steam boiler.

Across the furnace extend rows of screen tubes 20 and 22 which are shown connected at their lower ends to an inlet header 24, and at their upper ends to an outlet header 26. These headers may be joined by any suitable connections with the fluid circulation system of the boiler. In the present instance such connections include the conduits 25 and 27.

As illustrated, the furnace screen tubes are covered by slag collectors. Fig. 2 indicates the tubes 20 as covered only partially by the slag collectors, whereas, the tubes of the lower row 22 are completely covered. Furthermore, the slag collectors on all of the tubes are eccentrically mounted thereon. As shown, those on the lower tubes have their parts of greater radial length extending upward in the general direction of adjacent tubes of the upper row, while corresponding parts of the slag collectors on tubes of the upper row extend downwardly and toward adjacent tubes of the lower row. Centrally of the furnace the latter parts of the slag collectors on the two central tubes of the upper row extend toward the lower tube which is mounted below and between them.

Each slag collector includes refractory material 28 which may be installed as a plastic around metallic studs 30 welded to the tubes. The studs may be headed, and arranged with their heads at their tube ends. They extend through and, as shown, substantially to the surface of the refractory material. As shown, the studs 30, 32 and 34 on the lower sides of the tubes of the lower row are of substantially equal lengths, while the studs 36, 38 on the upper sides of the lower tubes are much longer. There is a reversal of this arrangement of the studs upon the tubes of the upper row.

When the illustrative furnace is operated under conditions which include the presence of a large amount of solids in suspension in the furnace gases, particles of molten slag are deposited upon the slag collectors around the screen tubes, and the extent of this depositing is increased by the particular formation and arrangement of the slag collectors which are shown in this application. The gases sweep across the wide surfaces which are formed by adjacent slag collectors upon adjacent tubes in different rows of the furnace screen. The extensions of the slag collectors from lower and upper rows to a position approximately midway of the upper and lower rows provides these extended surfaces for slag collection. Also, the furnace screen tubes and the main body of the slag collectors are maintained by the fluid circulation at a temperature below the fusion temperature of the slag while the surface of the latter may be above that temperature.

By reason of the proximity of the lower portions of the slag collectors on the upper screen tubes to the upper portions of the slag collectors on the lower screen tubes, it takes only a small amount of collected slag to bridge the gap between those collectors. When they are thus joined, the sticky slag collecting surfaces of the screen are still further increased and there is formed a screen structure in the nature of an inclined beam which includes an upper tube and a lower tube with the material joining them. Excessive sagging of the screen tubes is thereby resisted.

Slag continually accumulates around the screen tubes and their collector structures until the cooling effect of the fluid circulation becomes diminished at the outer surfaces of the combined bodies. Thereupon the tubes are all covered with a sticky molten mass which continues to collect ash matter suspended in the furnace gases, and the flow of molten slag from the surface maintains a balanced condition. Any combustible solids which pass the furnace screen are largely burned in that part of the furnace which extends above the screen. By reason of these actions, the furnace gases are freed from a large portion of their solids before they contact with the tubes of the boiler. The effectiveness of the heat exchange carried on in those tubes and the wall tubes is accordingly maintained.

Such ashy matter as passes beyond the screen is cooled by radiation while passing through the space above the screen, so that deposit of it in a molten state on the boiler tubes at the top is prevented, and frozen slag will not accumulate on the tubes.

While, in the illustrative apparatus, the furnace screen protects the steam generating tubes of the boiler against excessive deposits from the burning fuel, it also protects them or any deposits on them from further overheating by diminishing the amount of heat directly radiantly transmitted to those tubes from burning fuel and combustion products in the very hot lower part of the furnace. This is done without entirely eliminating the direct radiant transmission of heat from the lower ignition zone of the furnace to the side walls above the furnace screen. Thus, in the illustrative organization, radiantly heated fluid heat exchange surfaces such as water walls and wall tube superheaters may be advantageously used above the furnace screen.

By reference to Fig. 2 of the drawings it will be seen that there are comparatively wide oblique passages between the groups of furnace screen tubes. These passages provide free gas flow spaces and permit direct radiant heat transmission from points below the screen tubes to positions above them, and the paths for such transmission, for the most part, run divergently upwardly. Thus, if the reception of heat radiantly transmitted between the screen tubes to a transverse plane extending through the lower steam generating tubes is considered, the distribution of this heat will not be uniform across the gas pass. There will be a preponderance of such heat received at positions adjacent the furnace walls.

Referring again to the particular furnace construction shown in the drawings, the walls and floor of the furnace include fluid cooled tubes. As shown, the wall 40 includes wall tubes 42 connecting the headers 44 and 46, the latter of which is connected to the boiler drum by tubes 47. This wall may have a bottom support consisting of saddles 48 mounted upon base 50 with rollers 52 interposed. The opposite wall includes a lower portion 54 and the upper portion 56 including wall tubes 58 and 60 connected to headers 62, 64, and 66, the latter of which may be connected to the boiler drum by conduits 67.

From the headers 66 floor tubes 68 extend across the furnace and between the tubes 42 to a header 70. When the furnace is a slag tap furnace, the floor tubes have floor blocks 71 secured thereon, and wall blocks 72 are secured to the wall tubes at positions near the floor. Slag may be periodically tapped through an opening 74 which may be normally closed by refractory material of any suitable nature.

The high drum boiler above the furnace includes a steam and water drum 76 which is connected to the uptake headers 78 by conduits which have long riser portions 80 and horizontal circulator portions 82. The downtake conduits 84 connect the water space of the drum with the downtake headers 86 and are arranged in offset relationship as shown. This arrangement provides for a minimum resistance to gas flow through the gas outlet 88 and gas pass 90, and further facilitates the installation of inlet and outlet tubes 92 and 94 of the economizer 96. These inlet tubes extend from the feed water inlet header 98 into the gas pass 99, and the outlet tubes are connected to the outlet header 100 which is in communication with the water space of the drum.

The gas space above the bank of inclined steam generating tubes is separated into two passes by an inclined baffle 104 which forms a continuation of the upright baffle 106 both of which are protected by reason of their relationship to cooling tubes 108 connected into the boiler circulation by the header 110 and the tubes 112. At their lower ends the tubes 108 are preferably connected to the downtake headers 86.

The furnace gases after passing over the steam generating tubes 18 continue upwardly in the first gas pass passing the superheater 114 which is preferably connected to the steam and water drum 76 by means of conduits 116 and the superheater inlet header 118.

Beyond the superheater the gases contact with a fluid heater 120 which is herein shown as a reheater having return bend tubes connected to the headers 122 and 124. After passing over the reheater the gases flow between the tubes 112 and thence across the economizer to the gas outlet.

The tubes 108 preferably support the baffles 104 and 106 and the tubes themselves are supported from the header 110 which is suspended by hangers 126 preferably secured to a cross member 128 of the boiler setting. These hangers are preferably secured to the tubes by some welded connection 130.

As shown in Fig. 1, there are two rows of conduits 116 leading upwardly from the superheater inlet header 118, and these conduits are preferably supported by hangers 132 in the same manner that the tubes 112 are supported. When the parts are arranged in this manner, the headers 122, 124 and 134 are positioned between the conduits 116 and may be advantageously maintained by the conduits themselves.

Although the invention has been described with reference to the particular embodiment shown in the drawings, it is to be understood that it is not limited thereto, but is commensurate with the scope of the subjoined claims.

I claim:

1. In fluid heat exchange apparatus, a furnace, a fluid cooled furnace screen including inclined tubes extending across the path of furnace gases and connected into fluid circulation, fluid cooled walls extending above the screen and parallel thereto, inclined fluid heat exchange tubes substantially spaced from one side of the screen, means for burning a slag forming fuel on the other side of the said screen tubes so that all of the furnace gases pass between the said screen tubes and slag collectors so constructed and obliquely arranged on the screen tubes that the preponderance of heat radiantly transmitted between the screen tubes to the space forwardly of the fluid heat exchange tubes is transmitted along paths between screen tubes which diverge from positions in front of the screen and between the walls of the furnace.

2. In a steam boiler and its furnace, upper and lower rows of fluid cooled furnace screen tubes extending across the path of furnace gases and connected into fluid circulation, means for burning pulverized coal at one side of the screen, a bank of inclined steam generating tubes spaced substantially from the other side of the screen, a fluid cooled side wall bounding the space between the screen and the steam generating tubes and parallel to the screen tubes, and slag collectors obliquely constructed and arranged on the screen tubes to cause the preponderance of heat radiantly transmitted between the screen tubes to the space forwardly of the steam generating tubes to be transmitted along paths between the screen tubes which diverge from positions in front of the screen and between the walls of the furnace whereby the fluid cooled wall is subjected to a higher degree of radiant heat than the steam generating tubes.

3. In a coal fired furnace, spaced screen tubes extending into the path of the furnace gases, and arranged at different levels, and refractory dust collector units obliquely mounted on the tubes with the units on upper tubes extending toward adjacent and offset lower tubes, said units being radially oblique to vertical planes parallel to the longitudinal axes of the tubes.

4. In a furnace, spaced screen tubes positioned at different levels, means for burning pulverized coal beneath the tubes, and dust collectors extending obliquely from the upper and the offset lower tubes toward each other and converging toward positions approximately midway of the screen formed by those tubes, the confronting portions of adjacent upper and lower collectors being so close together that slag readily bridges them.

5. In a slag tap furnace having fluid cooled walls, a pulverized coal burner, screen tubes extending across the furnace at different levels, and inclined slag collectors obliquely mounted on the tubes and consisting of refractory material covering the tubes and anchored thereon by metallic studs welded to the tubes, said collectors being radially oblique to vertical planes parallel to the longitudinal axes of the tubes.

6. In a slag tap furnace, a pulverized coal burner, furnace walls including cooling tubes, dust screen tubes extending across the furnace, and slag collecting units eccentrically mounted on the screen tubes with the major portions of the units on vertically adjacent tubes extending toward each other, said units consisting of refractory material and metallic studs welded to the tubes and extending into the refractory.

7. In a furnace screen, tubes connected into a fluid circulation and arranged in rows oblique to the general path of furnace gases approaching the tubes, metallic studs radially arranged on the tubes and welded thereto, and refractory material contacting with the tubes and positioned between the studs, said refractory material forming bodies having one set of sides wider than the other and having their wider sides arranged along the path of the furnace gases.

8. In a furnace slag screen, fluid circulating tubes, metallic pins of different lengths arranged radially on the tubes and welded thereto with the longer pins arranged on corresponding sides of the tubes and extending toward adjacent tubes, and a separate sheath of refractory material enclosing each tube with the pins extending into the sheaths.

9. In a furnace slag screen, fluid circulating tubes arranged in a front row and a rear row with reference to the course of furnace gases, the tubes of the front row being so arranged with reference to adjacent tubes of the rear row that oblique rows are formed transversely of the front and rear rows, separate refractory sheaths on the tubes, and metallic pins welded to the tubes and extending into the sheaths, said sheaths forming bodies having sides of unequal width and having their wider sides arranged along the path of the furnace gases.

10. In fluid heat exchange apparatus, a furnace, means for burning a slag forming fuel in the furnace, inclined fluid cooled tubes extending across the furnace in the path of the furnace gases, and refractory slag collectors substantially sheathing the tubes and presenting sides of unequal width with their wider surfaces arranged obliquely to the vertical and forming paths for the furnace gases, said collectors comprising metallic studs in good heat exchange relation with the tubes and non-metallic refractory material held in position by the studs.

11. In a fluid cooled furnace screen for the furnaces of fluid heat exchange apparatus, inclined screen tubes connected into a fluid circulation, metallic studs in good heat exchange relation with the tubes, and non-metallic refractory material on the tubes combining with the studs to form slag collecting bodies presenting sides of unequal width with their wider sides arranged obliquely to the path of the furnace gases and slag particles carried in suspension by those gases.

12. In fluid heat exchange apparatus; a furnace; means for burning a slag forming fuel in the furnace; fluid heat exchange tubes absorbing heat from the furnace gases; and fluid cooled slag collecting means effective upon the furnace gases to remove slag therefrom before they contact with said tubes; said slag collecting means including inclined tubes connected into fluid circulation and extending across the path of the tubes in good heat exchange relation therewith, and refractory material embracing the tubes and constituting bodies presenting sides of unequal width with their wider surfaces arranged obliquely to the path of the furnace gases and slag carried in suspension thereby.

ROLFE SHELLENBERGER.